United States Patent
Krüger

(10) Patent No.: US 11,380,142 B2
(45) Date of Patent: Jul. 5, 2022

(54) METHOD FOR MEASURING A DRIVING EVENT, SERVER DEVICE, AND SYSTEM COMPRISED OF THE SERVER DEVICE AND A PLURALITY OF MOTOR VEHICLES

(71) Applicant: Audi AG, Ingolstadt (DE)

(72) Inventor: Sebastian Krüger, Ingolstadt (DE)

(73) Assignee: Audi AG, Ingolstadt (DE)

( * ) Notice: Subject to any disclaimer, the term of this patent is extended or adjusted under 35 U.S.C. 154(b) by 293 days.

(21) Appl. No.: 16/328,174

(22) PCT Filed: Jul. 27, 2017

(86) PCT No.: PCT/EP2017/069099
§ 371 (c)(1),
(2) Date: Feb. 25, 2019

(87) PCT Pub. No.: WO2018/041490
PCT Pub. Date: Mar. 8, 2018

(65) Prior Publication Data
US 2019/0347872 A1 Nov. 14, 2019

(30) Foreign Application Priority Data
Aug. 29, 2016 (DE) ............... 10 2016 216 152.0

(51) Int. Cl.
*G07C 5/00* (2006.01)
*G07C 5/08* (2006.01)
(Continued)

(52) U.S. Cl.
CPC ............. *G07C 5/008* (2013.01); *G06V 20/56* (2022.01); *G07C 5/0841* (2013.01);
(Continued)

(58) Field of Classification Search
CPC .. G07C 5/008; G07C 5/0841; G06K 9/00791; G08G 1/0112; G08G 1/0141; G08G 1/096775
See application file for complete search history.

(56) References Cited

U.S. PATENT DOCUMENTS 9,043,049 B2   5/2015   Reich
9,368,030 B2   6/2016   Hainzimaier et al.
(Continued)

FOREIGN PATENT DOCUMENTS

CN   103635361 A   3/2014
CN   104781865 A   7/2015
(Continued)

OTHER PUBLICATIONS

International Search Report and Written Opinion of the International Searching Authority directed to related International Patent Application No. PCT/EP2017/069099, dated Oct. 11, 2017, with attached English-language translation; 13 pages.
(Continued)

*Primary Examiner* — Maceeh Anwari
*Assistant Examiner* — Charles Pall
(74) *Attorney, Agent, or Firm* — Sterne, Kessler, Goldstein & Fox P.L.L.C.

(57) ABSTRACT

A method is disclosed for measuring a driving event, a server device receiving first event data from a first motor vehicle, which first event data signal the driving event identified by a first detection apparatus of the first motor vehicle. The method further provides that the server device generates configuration data on a basis of the first event data in order to configure a second detection apparatus of a second motor vehicle that is different from the first detection apparatus of the first motor vehicle and sends the configu-
(Continued)

ration data to the second motor vehicle in order to generate second event data that describe the driving event.

20 Claims, 1 Drawing Sheet

(51) Int. Cl.
  *G08G 1/01* (2006.01)
  *G08G 1/0967* (2006.01)
  *G06V 20/56* (2022.01)
(52) U.S. Cl.
  CPC ......... *G08G 1/0112* (2013.01); *G08G 1/0141* (2013.01); *G08G 1/096775* (2013.01)

(56) References Cited

U.S. PATENT DOCUMENTS

| | | | |
|---|---|---|---|
| 10,163,345 | B2 | 12/2018 | Nusser et al. |
| 10,176,524 | B1* | 1/2019 | Brandmaier ............ G06Q 40/08 |
| 10,395,332 | B1* | 8/2019 | Konrardy .......... G06F 16/90335 |
| 2008/0258890 | A1* | 10/2008 | Follmer ................ B60R 25/102 |
| | | | 340/439 |
| 2014/0160295 | A1* | 6/2014 | Kyomitsu ............ G08G 1/0112 |
| | | | 348/159 |
| 2014/0324247 | A1 | 10/2014 | Jun |
| 2015/0088335 | A1 | 3/2015 | Lambert et al. |
| 2016/0133130 | A1* | 5/2016 | Grimm ................... H04W 4/80 |
| | | | 340/905 |

FOREIGN PATENT DOCUMENTS

| | | |
|---|---|---|
| CN | 105336173 A | 2/2016 |
| CN | 105620391 A | 6/2016 |
| CN | 105684062 A | 6/2016 |
| CN | 109308802 A | 2/2019 |
| DE | 102013210553 A1 | 12/2014 |
| DE | 102014004167 A1 | 10/2015 |
| DE | 102014223620 A1 | 5/2016 |

OTHER PUBLICATIONS

International Preliminary Report on Patentability directed to related International Patent Application No. PCT/EP2017/069099, dated Dec. 17, 2018, with attached English language translation; 11 pages.
Office Action filed in application No. CN 201780052819.4, with attached English language translation, dated Jul. 1, 2021; 9 pages.

* cited by examiner

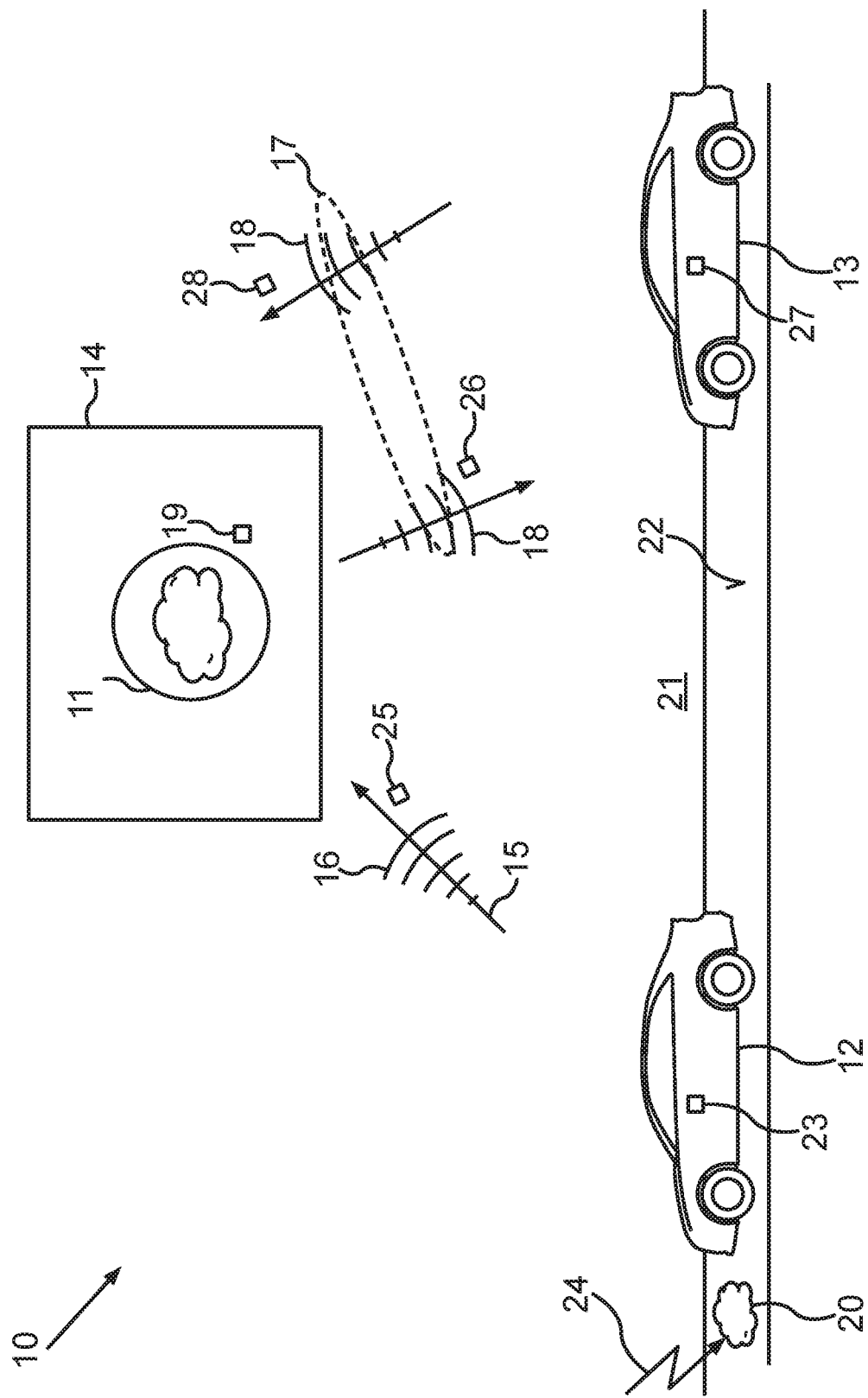

METHOD FOR MEASURING A DRIVING EVENT, SERVER DEVICE, AND SYSTEM COMPRISED OF THE SERVER DEVICE AND A PLURALITY OF MOTOR VEHICLES

TECHNICAL FIELD

This disclosure relates to a method for measuring a driving event, which can take place independently in each of a plurality of motor vehicles. Such a driving event can be driving in the rain or driving over a pothole, for example. The driving event can also take place inside the vehicle, for example, the cooperation or interaction between a plurality of control units. This disclosure also relates to a server device that can be used to carry out the method. The server device can be a server of the Internet, for example. Lastly, this disclosure also relates to a system comprising the server device and a plurality of motor vehicles.

BACKGROUND

In order to collect information relating to driving events in a stationary server device, motor vehicles may be equipped with a detection apparatus in each case, which detects such a driving event and sends event data, which describe the driving event, to the server device. Nowadays, detection apparatuses installed in motor vehicles can detect situations or driving events relating to the driving condition, the vehicle's surroundings and/or environmental conditions. The server device can then use the event data received to locate this driving event on a digital roadmap. Driving conditions (roughness, potholes, wet conditions) or local hazard information (broken down vehicles, deer crossing) can therefore be mapped, for example. The quality of the event data depends on how the respective detection apparatuses are configured in the motor vehicles. Because the radio link between the motor vehicle on the one hand and the server device on the other only has a limited transmission bandwidth and/or due to the costs of transmitting event data, a balance must be created by means of the configuration of a detection apparatus. Each detection apparatus must be configured such that the event data, which is generated for a driving event, describe this driving event with a sufficient degree of accuracy and the data volume for the event data is small enough such that it can actually be transmitted to the server device cost-efficiently and/or with the available transmission bandwidth.

A detection apparatus for recording the condition of a road is known from DE 10 2014 004 167 A1, for example.

DE 10 2014 223 620 A1 discloses identifying the road condition on the basis of event data from a detection apparatus of a motor vehicle and subsequently checking whether another motor vehicle is approaching the region in which the road condition has been identified, and correspondingly preparing this motor vehicle for this.

DE 10 2013 210 553 A1 discloses checking whether a motor vehicle is approaching a section of the road of a predetermined condition, and preparing the motor vehicle for travelling on this section of the road.

US 2014/0 324 247 A1 describes an image-processing appliance of a motor vehicle and a method for sharing data, which can verify a route, for example.

BRIEF DESCRIPTION OF THE DRAWINGS/FIGURES

The accompanying drawing, which is incorporated herein and forms part of the specification, illustrates the present embodiments and, together with the description, further serves to explain the principles of the present embodiments and to enable a person skilled in the relevant art(s) to make and use the present embodiments.

FIG. 1 illustrates a schematic view of one embodiment of the system disclosed herein.

The features and advantages of the present embodiments will become more apparent from the detailed description set forth below when taken in conjunction with the drawing, in which like reference characters identify corresponding elements throughout. In the drawing, like reference numbers generally indicate identical, functionally similar, and/or structurally similar elements.

DETAILED DESCRIPTION

The object of this disclosure is to efficiently record driving events by detection apparatuses of motor vehicles.

The object is achieved by the subject matter of the independent claims. Advantageous developments are described by the dependent claims, the following description, and the drawing.

This disclosure specifies a method for quantifying or identifying or measuring a driving event. The driving event can be an encounter of a motor vehicle with a predetermined object in the surrounding area, for example. The surrounding area can be a street or a road, for example. The object can be a pothole or a road surface having a predetermined characteristic or a different motor vehicle that has broken down or a wild animal, for example. The driving event can also be driving past or passing a specific object, for example, a road sign. A journey in a predetermined driving condition can additionally or alternatively also be recorded as the driving event. A driving event can accordingly be a journey in the rain and/or at a predetermined ambient temperature, for example. The driving event can also consist in the nonappearance of an expected event, if, for example, a pothole recorded in map data is not detected by a sensor apparatus of the motor vehicle. A driving event can also be instigated or initiated by the driver of the motor vehicle, for example, a predetermined steering movement as a result of an evasive maneuver, for example.

A stationary server device receives first event data that signal the driving event from a first motor vehicle. The first motor vehicle can identify the driving event using a detection apparatus. For example, for the driving event "driving in the rain," a rain sensor of the first motor vehicle can be used as the detection apparatus. For the driving event "driving over a pothole," an acceleration sensor can be used as the detection apparatus, for example, for sensing shaking movements of the first motor vehicle and/or a suspension travel sensor can be used for identifying the activity of vibration dampers of the motor vehicle.

If the driving event in a motor vehicle is very short, such as driving over a pothole, after the first event data has been received, it is too late for the detection apparatus of the first motor vehicle to request additional event data relating to the driving event that has a greater degree of measurement accuracy and/or is provided by additional sensors. However, it is also inefficient for the detection apparatus to continuously generate more than just the first event data for each driving event, because then also very high amounts of data have to be transmitted to the server device.

Instead, the server device generates configuration data on a basis of the first event data to reconfigure a detection apparatus of a second motor vehicle that is different from the first motor vehicle, and sends the configuration data to the second motor vehicle so that the second motor vehicle generates and sends second event data in accordance with requests made by the server device, which likewise describe the driving event that takes place in the second motor vehicle. The second motor vehicle then generates the second event data using its detection apparatus, which, however, generates the second event data on a basis of the configuration data here, i.e., describes the driving event in greater detail than the first event data by providing more event data, for example, because this is defined by the configuration data in this way. Therefore, the detection apparatus of the second motor vehicle is configured for a more accurate and/or more extensive description of the driving event by using the configuration data where necessary, i.e., when a driving event has been signaled by the first motor vehicle and the first event data. Therefore, in motor vehicles, the respective detection apparatuses thereof can firstly be operated in a manner configured to generate first event data, which signal a driving event without describing it in more detail or with a predetermined level of detail. The detection apparatus of at least one second motor vehicle is reconfigured using the configuration data where necessary, i.e., if a driving event has been identified, is such that the second event data relating to the driving event are generated.

A radio link is therefore efficiently used to transmit event data, for example, whereby the configuration data are used to set a data volume for the second event data, which is greater than a data volume for the first event data. When transmitting the first event data, a smaller percentage of a transmission bandwidth of the communication connection between the first motor vehicle and the server device is therefore utilized than that of a transmission bandwidth of a communication apparatus between the second motor vehicle and the server device. The utilization or loading of the communication connection using the data volume of the second event data takes place if a driving event has been signaled successfully by the first event data. Therefore, a predetermined percentage of the available transmission bandwidth is then utilized if second event data are required.

Accordingly, the second event data describes more details about the driving event than the first event data. More sensor data and/or additional sensor data, which are generated by the respective detection apparatuses, can be contained in the second event data, for example, which sensor data are not contained in the first event data.

The second event data are preferably requested in the relevant surroundings of corresponding motor vehicles, i.e., the process of sending the configuration data is limited to the relevant surroundings, and second event data is not recorded over a wide area. For this purpose, after receiving the first event data, the server device preferably determines in which motor vehicle of a plurality of motor vehicles the driving event likewise takes place or which of said motor vehicles the driving event lies ahead of. For example, it is possible to determine which of the motor vehicles is approaching a location in which the first motor vehicle has detected the driving event. In addition or alternatively to a location, this can also be time-based, for example. Therefore, using configuration data, for example, the second motor vehicle can generate the second event data at a specific time and/or within a predetermined time period. Therefore, a journey in the dark can be reconstructed as a driving event, for example. In addition or alternatively to the location and time, using configuration data, for example, the second event data can be recorded on a basis of the weather, irrespective of whether the first motor vehicle and the second motor vehicle are in the same region. Therefore, the configuration data can thus be used to initiate the generation of the second event data based on the location and/or time and/or weather.

As already stated, the configuration data can be used to generate such second event data that describe a process that takes place inside the second motor vehicle, for example, communication and/or control by a control unit of the motor vehicle. Predetermined processes in the motor vehicle can therefore be logged by generating the second event data if the server device has identified undesirable operating behavior in the first motor vehicle using the first event data. The operating mode of a predetermined vehicle type or vehicle model of the first and the second motor vehicle can therefore be checked, for example.

A description of the driving event can also be entered or generated in a digital area map on a basis of the second event data. As a result, objects in the surrounding area, for example, potholes and/or a predetermined road condition and/or a broken-down vehicle and/or a building site and/or a road sign, can be described, for example, on the basis of the second event data and entered in or mapped on the digital area map.

To carry out the method, the stationary server device described is required for measuring a driving event. The driving event occurs independently in a plurality of motor vehicles. If the driving result is described or signaled by the first motor vehicle using the first event data, the server device can select a second motor vehicle and configure it using the described configuration data such that the second motor vehicle, together with its detection apparatus, generates the second event data that relates to the driving event. Of course, the server device can configure more than just one second motor vehicle, i.e., a plurality of second motor vehicles, using respective configuration data in each case such that a plurality of second motor vehicles generate second event data and send it to the server device in each case. To carry out the method, the server device comprises a processor, which is designed to carry out the method. For this purpose, the processor can comprise at least one microcontroller and/or at least one microprocessor. Furthermore, the processor can comprise a program code, which, when executed by the processor, is designed to carry out the embodiment of the method. The program code can be stored in a data store of the processor, for example. The server device can be operated as a server of the Internet, for example. For this purpose, the server device can comprise a computer or a computer network comprising several computers, for example.

The system is formed by combining the server device with motor vehicles. A first motor vehicle of the system comprises a detection apparatus for detecting a predetermined driving event and for generating first event data, which signal the driving event. A second motor vehicle comprises a detection apparatus, which can be configured using configuration data via a radio link, for detecting the driving event and for generating second event data. The second event data describe the driving event, the description accuracy of the second event data being dependent on the configuration data. "Description accuracy" means in this case that a data volume for the second event data and/or at least one sensor of the detection apparatus, by which the event data are generated, and/or different aspects of the driving event are set on the basis of the configuration data. The system also comprises an embodiment of the server device, which is designed in the manner described to receive the first event data from the first motor vehicle, to then generate the configuration data and to send it to the second motor vehicle so that the second motor vehicle generates the second event data on the basis of configuration data and sends it to the server device.

Embodiments also include developments of the system that comprise features that have already been described in connection with the developments of the method. For this reason, the corresponding developments of the system will not be described again here.

The first motor vehicle and the second motor vehicle are each preferably formed as cars, in particular passenger cars or lorries.

One embodiment is described in the following. For this purpose, FIG. 1 is a schematic view of one embodiment of the system.

The embodiment outlined in the following is a preferred embodiment. In the embodiment, each of the components described therein represent individual features that are to be considered independently of one another and as a component either in isolation or in a different combination to that shown. Furthermore, additional features that have already been described can also be added to the embodiment described.

FIG. 1 shows a system 10 comprising a server device 11, a first motor vehicle 12, and a second motor vehicle 13. The server device 11 can be a server of the Internet 14, for example. The server device 11 can be formed on a basis of a computer or a computer network, for example.

The first motor vehicle 12 can be coupled to the server device 11 via a first communication connection 15. The first communication connection 15 can be formed on a basis of a first radio link 16, for example, which can be formed using a mobile network and/or a WLAN router (WLAN—Wireless Local Area Network). The second motor vehicle 13 can be coupled to the server device 11 via a second communication connection 17. The second communication connection 17 can comprise a second radio link 18, which can likewise be formed using a mobile network and/or a WLAN router.

Via the first and second motor vehicles 12, 13, respectively, the server device 11 can generate a digital map 19, for example, in which objects 20 in the surrounding area 21 of the first and second motor vehicles 12, 13 can be mapped. For example, a pothole on a lane 22 can be mapped as the object 20. In order to collect information about every object 20, the system 10 does not require a large data volume to be transmitted continuously via the first and second communication connections 15, 17. Instead, the first motor vehicle 12 can detect just one encounter or occurrence of the object 20 by using a first detection apparatus 23, without the object 20 being described with a sufficient amount of detail for the digital map 19. For this purpose, the first detection apparatus 23 can comprise at least one sensor, for example, a camera and/or an acceleration sensor and/or a radar sensor (to name but examples). If the encounter with the object 20 is detected as a driving event 24 by the first detection apparatus 23 of the first motor vehicle 12, the first motor vehicle 12 can signal the driving event 24 to the server device 11 via the first communication connection 15 as first event data 25. It is therefore known in the server device 11 that a specific driving event 24 has taken place. In order to signal the driving event 24, a data volume for the first event data 25 can be smaller than a data volume that is required to map the object 20 in the digital map 19. The server device 11 can generate configuration data 26 when it receives the first event data 25 or on the basis of this data, which configuration data can be transmitted to the second motor vehicle 13 via the second communication connection 17. The server device 11 can determine as the second motor vehicle 13 a motor vehicle whose route is known and leads to the object 20, for example, so that when the object 20 is reached, the driving event 24, for example, driving over the pothole or driving past the pothole, is likewise provided for the second motor vehicle 13.

The second motor vehicle 13 can likewise comprise a second detection apparatus 27, which can have the described design. Using the configuration data 26, the second detection apparatus 27 can be configured in such a way that, using the second detection apparatus 27, second event data 28 relating to the object 20, i.e., to the driving event 24, are generated, the data volume of which is greater than that of the first event data 25. The second event data 28 can then suffice to map the object 20 in the digital map 19. For example, the first event data 25 can merely signal that the first motor vehicle 12 shakes when driving over a pothole. The second event data 28 can then contain a camera image of the object 20, for example, which the first event data 25 does not contain.

Therefore, using the server device 11, the first and second event data 25, 28, respectively, to be collected in the respective motor vehicles are configured for individual motor vehicles during operation using the configuration data 26 according to the requests made by the server device 11. On a basis of the results that the first motor vehicle 12 has sent, additional second event data 28 are requested on the basis thereof from a different motor vehicle acting as the second motor vehicle 13 or a plurality of different motor vehicles in the surrounding area 21, so that an in-depth analysis of the driving event 24, in particular, is possible and/or additional functionalities of the server device 11, such as creating or generating the digital map 19, can be carried out from this analysis. The resultant increased data volume for the second event data 28 is requested in the relevant surroundings or in the relevant surrounding area 21 in this case, and is therefore not requested in particular across a wide area.

One example is the first motor vehicle 12 described, which, in its current position, can signal a pothole as an object 20 using the first event data 25. Other motor vehicles, such as the second motor vehicle 13, which are likewise travelling on this street and approaching the position of the pothole, are configured using the configuration data 26 such that they send level values from the chassis, for example, as second event data 28 within a predetermined radius of the reported pothole position. In particular, the resolution of the level values is greater than that of the first detection apparatus 23 of the first motor vehicle 12. From these values, the information "pothole" can then be refined or generated with a greater level of detail in the server device 11, in order to thereby determine the depth and/or extent of the pothole in the lane 22 of the road, for example. On the basis thereof, for example, a warning may or may not be issued in different ways before the pothole.

This therefore provides the optimum use of the available transmission bandwidth of the first and second communication connections 15, 17 with regard to saving costs, for example, whereby, as the analysis possibility is simultaneously increased, the bandwidth use is increased where necessary. This happens using extensive data recording wherever a corresponding data depth or data volume is required, which is identified using the first event data 25.

The first and second detection apparatus 23, 27, respectively, in the motor vehicle 12, 13 of the system 10 can be configured using commands or configuration data 26 of the server device 11, whereby a communication apparatus (not shown) of the first and second motor vehicle 12, 13 transmits the configuration data 26 to the first and second detection apparatus 23, 27, respectively, via a vehicle bus system (for example CAN—Controller Area Network), for example. Evaluation logic is preferably provided on the server side of the server device 11, which determines for which driving events 24, which are reported or signaled from the first motor vehicle 12 using the first event data 25, a further or deeper analysis is provided. Corresponding configuration data 26 are then carried out by at least one second motor vehicle 13 using the second detection apparatus 27 thereof. The driving events 24 can, but do not have to be, based on location or time. The server device 11 can therefore configure or set or request the measurement of defined signals using the configuration data 26 via communication with the vehicle-mounted second detection apparatus 27.

As a whole, the example shows how the embodiments of this disclosure can be used to set an event-determined measuring depth for vehicle-based online data recording.

The invention claimed is:

1. A method for surveying a driving event, the method comprising:
   identifying, by a first detection apparatus of a first motor vehicle, the driving event;
   generating, by the first detection apparatus of the first motor vehicle, first event data representing the driving event;
   transmitting, by the first motor vehicle to a server device, the first event data;
   generating, by the server device, as a function of the first event data received from the first motor vehicle, configuration data for reconfiguring a second detection apparatus of a second motor vehicle different from the first detection apparatus of the first motor vehicle;
   transmitting, by the server device, the configuration data to the second motor vehicle; and
   generating, by the second detection apparatus of the second motor vehicle, second event data describing the driving event according to requirements received from the server device with the configuration data, wherein a data volume of the second event data is set based on the configuration data, and the data volume of the second event data exceeds a corresponding data volume of the first event data, and wherein the generating of the second event data further comprises:
      generating, by the second detection apparatus of the second motor vehicle, based on the configuration data, the second event data describing more detail corresponding to the driving event than information provided in the first event data corresponding to the driving event.

2. The method of claim 1, wherein the driving event comprises an encounter with an object in a surrounding area or a trip under a predetermined driving condition.

3. The method of claim 1, further comprising:
   ascertaining, by the server device, after receiving the first event data, for which motor vehicle of a plurality of motor vehicles the driving event is taking place or for which motor vehicle of the plurality of motor vehicles the driving event is impending; and
   selecting, by the server device, at least one of the motor vehicles of the plurality of motor vehicles, in which the driving event is taking place or for which the driving event is impending, as the second motor vehicle.

4. The method of claim 1, wherein the generation of the second event data is triggered by the configuration data based on location, time, or weather.

5. The method of claim 1, wherein the generation of the second event data, triggered by the configuration data, describes at least one vehicle-internal occurrence of the second motor vehicle.

6. The method of claim 1, further comprising:
   entering, by the server device, a description of the driving event into a digital map of a surrounding area based on the second event data.

7. A server device for surveying a driving event taking place in a plurality of motor vehicles, wherein the server device comprises a processor unit configured to:
   receive, from a first motor vehicle of the plurality of motor vehicles, first event data representing the driving event, wherein the driving event is identified by a first detection apparatus of the first motor vehicle;
   generate, as a function of the first event data, configuration data for reconfiguring a second detection apparatus of a second motor vehicle different from the first detection apparatus of the first motor vehicle; and
   transmit the configuration data to the second motor vehicle,
   wherein the second detection apparatus of the second motor vehicle generates second event data describing the driving event according to requirements received from the server device with the configuration data,
   wherein a data volume of the second event data is set based on the configuration data, and the data volume of the second event data exceeds a corresponding data volume of the first event data, and
   wherein the second detection apparatus of the second motor vehicle generates, based on the configuration data, the second event data describing more detail corresponding to the driving event than information provided in the first event data corresponding to the driving event.

8. The server device of claim 7, wherein the driving event comprises an encounter with an object in a surrounding area or a trip under a predetermined driving condition.

9. The server device of claim 7, wherein the processor unit is further configured to:
   ascertain, after receiving the first event data, for which motor vehicle of the plurality of motor vehicles the driving event is taking place or for which motor vehicle of the plurality of motor vehicles the driving event is impending; and
   select at least one of the motor vehicles of the plurality of motor vehicles, in which the driving event is taking place or for which the driving event is impending, as the second motor vehicle.

10. The server device of claim 7, wherein the generation of the second event data is triggered by the configuration data based on location, time, or weather.

11. The server device of claim 7, wherein the generation of the second event data, triggered by the configuration data, describes at least one vehicle-internal occurrence of the second motor vehicle.

12. The server device of claim 7, wherein the processor unit is further configured to:
   enter a description of the driving event into a digital map of a surrounding area based on the second event data.

13. A system, comprising:
   a first motor vehicle of a plurality of motor vehicles, comprising a first detection apparatus with a first processor, wherein the first processor is configured to:
      detect a driving event; and
      generate first event data indicating the driving event;

a second motor vehicle of the plurality of motor vehicles, comprising a second detection apparatus with a second processor, wherein the second processor is configured to:
  configure the second detection apparatus using configuration data received via a radio link;
  detect the driving event; and
  generate second event data, based on the configuration data, describing more detail corresponding to the driving event than information provided in the first event data corresponding to the driving event, wherein a data volume of the second event data is set based on the configuration data, and the data volume of the second event data exceeds a corresponding data volume of the first event data; and
a server device, comprising a processor unit, wherein the processor unit is configured to:
  receive, from the first motor vehicle of the plurality of motor vehicles, the first event data representing the driving event, wherein the driving event is identified by the first detection apparatus of the first motor vehicle;
  generate, as a function of the first event data, configuration data for reconfiguring the second detection apparatus of the second motor vehicle different from the first detection apparatus of the first motor vehicle; and
  transmit the configuration data to the second motor vehicle.

14. The system of claim 13, wherein the driving event comprises an encounter with an object in a surrounding area or a trip under a predetermined driving condition.

15. The system of claim 13, wherein the processor unit of the server device is further configured to:
  ascertain, after receiving the first event data, for which motor vehicle of the plurality of motor vehicles the driving event is taking place or for which motor vehicle of the plurality of motor vehicles the driving event is impending; and
  select at least one of the motor vehicles of the plurality of motor vehicles, in which the driving event is taking place or for which the driving event is impending, as the second motor vehicle.

16. The system of claim 13, wherein the generation of the second event data is triggered by the configuration data based on location, time, or weather.

17. The system of claim 13, wherein the generation of the second event data, triggered by the configuration data, describes at least one vehicle-internal occurrence of the second motor vehicle.

18. The system of claim 13, wherein the processor unit of the server device is further configured to:
  enter a description of the driving event into a digital map of a surrounding area based on the second event data.

19. The method of claim 1, wherein the first detection apparatus or the second detection apparatus is a sensor.

20. The method of claim 19, wherein the sensor comprises one of a rain sensor, an acceleration sensor, a suspension sensor, a camera, or a radar sensor.

* * * * *